US007994686B2

(12) United States Patent
Chiang et al.

(10) Patent No.: US 7,994,686 B2
(45) Date of Patent: Aug. 9, 2011

(54) ELECTROCHEMICAL METHODS, DEVICES, AND STRUCTURES

(75) Inventors: Yet-Ming Chiang, Framingham, MA (US); Steven R. Hall, Burlington, MA (US); Fernando Tubilla Kuri, Cambridge, MA (US); Kyungyeol Song, Seoul (KR); Timothy E. Chin, Cambridge, MA (US); Georg Baetz, Gilching (DE)

(73) Assignee: Massachusetts Institute of Technology, Cambridge, MA (US)

( * ) Notice: Subject to any disclaimer, the term of this patent is extended or adjusted under 35 U.S.C. 154(b) by 750 days.

(21) Appl. No.: 11/796,138

(22) Filed: Apr. 26, 2007

(65) Prior Publication Data

US 2008/0157713 A1 Jul. 3, 2008

Related U.S. Application Data

(63) Continuation-in-part of application No. 11/150,477, filed on Jun. 13, 2005, now Pat. No. 7,541,715.

(60) Provisional application No. 60/795,328, filed on Apr. 26, 2006, provisional application No. 60/578,855, filed on Jun. 14, 2004, provisional application No. 60/621,051, filed on Oct. 25, 2004.

(51) Int. Cl.
*H01L 41/08* (2006.01)
(52) U.S. Cl. ....................................................... 310/311
(58) Field of Classification Search ................... 310/311
See application file for complete search history.

(56) References Cited

U.S. PATENT DOCUMENTS

| 3,573,511 | A | 4/1971 | Noren |
| 4,060,741 | A | 11/1977 | Schafft |
| 4,093,885 | A | 6/1978 | Brown |
| 4,194,062 | A | 3/1980 | Carides et al. |
| 4,382,882 | A | 5/1983 | Vogel et al. |
| 4,648,271 | A | 3/1987 | Woolf |
| 5,016,047 | A | 5/1991 | Meacham |
| 5,255,809 | A | 10/1993 | Ervin et al. |
| 5,268,082 | A | 12/1993 | Oguro et al. |

(Continued)

FOREIGN PATENT DOCUMENTS

DE 10026264 A1 11/2001

(Continued)

OTHER PUBLICATIONS

Barvosa-Carter, W. et al., "Solid-state actuation based on reversible Li electroplating," Smart Structures and Materials 2005: Active Materials: Behavior and Mechanics, *Proceedings of SPIE*, 5761, 90-97.

(Continued)

*Primary Examiner* — Mark Budd
(74) *Attorney, Agent, or Firm* — Wolf, Greenfield & Sacks, P.C.

(57) ABSTRACT

The present invention generally provides devices and methods involving electrochemical actuation. The devices may comprise at least one component capable of exhibiting a volumetric or dimensional change upon application of a voltage. In some cases, the volumetric or dimensional change may produce mechanical work. Some embodiments of the invention may provide devices capable of exhibiting high actuation rates and supporting high amounts of stress (e.g., in tensile and/or compressive loading). In some embodiments, the present invention may provide morphing structures that may be useful in applications such as airfoils.

9 Claims, 6 Drawing Sheets

FORWARD FLIGHT

HOVER

U.S. PATENT DOCUMENTS

| | | | |
|---|---|---|---|
| 5,351,164 A | 9/1994 | Grigortchak et al. | |
| 5,432,395 A | 7/1995 | Grahn | |
| 5,478,668 A | 12/1995 | Gozdz et al. | |
| 5,567,284 A | 10/1996 | Bauer et al. | |
| 5,671,905 A | 9/1997 | Hopkins, Jr. et al. | |
| 5,747,915 A | 5/1998 | Benavides | |
| 5,770,913 A | 6/1998 | Mizzi | |
| 5,800,420 A | 9/1998 | Gross et al. | |
| 5,848,911 A | 12/1998 | Garcin | |
| 5,858,001 A | 1/1999 | Tsals et al. | |
| 5,866,971 A | 2/1999 | Lazarus et al. | |
| 5,907,211 A | 5/1999 | Hall et al. | |
| 5,954,079 A | 9/1999 | Barth et al. | |
| 5,957,895 A | 9/1999 | Sage et al. | |
| 5,986,864 A | 11/1999 | Davis | |
| 5,989,423 A | 11/1999 | Kamen et al. | |
| 6,098,661 A | 8/2000 | Yim et al. | |
| 6,109,852 A | 8/2000 | Shahinpoor et al. | |
| 6,400,489 B1 | 6/2002 | Suzuki et al. | |
| 6,517,972 B1 | 2/2003 | Amatucci | |
| 6,530,900 B1 | 3/2003 | Daily et al. | |
| 6,545,384 B1 | 4/2003 | Pelrine et al. | |
| 6,555,945 B1 | 4/2003 | Baughman et al. | |
| 6,577,039 B2 | 6/2003 | Ishida et al. | |
| 6,589,229 B1 | 7/2003 | Connelly et al. | |
| 6,599,662 B1 | 7/2003 | Chiang et al. | |
| 6,682,500 B2 | 1/2004 | Soltanpour et al. | |
| 6,687,536 B1 | 2/2004 | Beck et al. | |
| 6,689,100 B2 | 2/2004 | Connelly et al. | |
| 6,699,218 B2 | 3/2004 | Flaherty et al. | |
| 6,752,787 B1 | 6/2004 | Clausey, III et al. | |
| 6,828,062 B2 | 12/2004 | Lu et al. | |
| 6,938,945 B2 | 9/2005 | Wald et al. | |
| 6,960,192 B1 | 11/2005 | Flaherty et al. | |
| 6,982,514 B1 | 1/2006 | Lu et al. | |
| 7,005,078 B2 | 2/2006 | Van Lintel et al. | |
| 7,014,625 B2 | 3/2006 | Bengtsson | |
| 7,025,743 B2 | 4/2006 | Mann et al. | |
| 7,044,928 B2 | 5/2006 | LeMay et al. | |
| 7,115,108 B2 | 10/2006 | Wilkinson et al. | |
| 7,144,384 B2 | 12/2006 | Gorman et al. | |
| 7,156,838 B2 | 1/2007 | Gabel et al. | |
| 7,205,669 B2 | 4/2007 | Miyazaki | |
| 7,273,889 B2 | 9/2007 | Memelstein et al. | |
| 7,274,128 B1 | 9/2007 | Liu et al. | |
| 7,298,017 B1 | 11/2007 | Liu et al. | |
| 7,410,476 B2 | 8/2008 | Wilkinson et al. | |
| 7,435,362 B2 | 10/2008 | Muroaka et al. | |
| 7,541,715 B2 | 6/2009 | Chiang et al. | |
| 7,569,050 B2 | 8/2009 | Moberg et al. | |
| D602,155 S | 10/2009 | Foley et al. | |
| D602,586 S | 10/2009 | Foley et al. | |
| 7,632,247 B2 | 12/2009 | Adams | |
| 7,652,907 B2 * | 1/2010 | Bloch et al. | 365/107 |
| 7,872,396 B2 | 1/2011 | Chiang et al. | |
| 2001/0053887 A1 | 12/2001 | Douglas et al. | |
| 2002/0039620 A1* | 4/2002 | Shahinpoor et al. | 427/2.12 |
| 2003/0135159 A1 | 7/2003 | Daily et al. | |
| 2003/0167035 A1 | 9/2003 | Flaherty et al. | |
| 2003/0170166 A1 | 9/2003 | Smalley et al. | |
| 2004/0038251 A1 | 2/2004 | Smalley et al. | |
| 2005/0119618 A1 | 6/2005 | Gonnelli | |
| 2005/0227071 A1 | 10/2005 | Muroaka et al. | |
| 2006/0095014 A1 | 5/2006 | Ethelfield | |
| 2006/0102455 A1 | 5/2006 | Chiang et al. | |
| 2006/0206099 A1 | 9/2006 | Olsen | |
| 2006/0231399 A1 | 10/2006 | Smalley et al. | |
| 2007/0021733 A1 | 1/2007 | Hansen et al. | |
| 2007/0049865 A1 | 3/2007 | Radmer et al. | |
| 2007/0112301 A1 | 5/2007 | Preuthun et al. | |
| 2007/0282269 A1 | 12/2007 | Carter et al. | |
| 2007/0287753 A1 | 12/2007 | Charnery et al. | |
| 2007/0299397 A1 | 12/2007 | Alferness et al. | |
| 2007/0299398 A1 | 12/2007 | Alferness et al. | |
| 2007/0299399 A1 | 12/2007 | Alferness et al. | |
| 2007/0299400 A1 | 12/2007 | Alferness et al. | |
| 2007/0299401 A1 | 12/2007 | Alferness et al. | |
| 2007/0299408 A1 | 12/2007 | Alferness et al. | |
| 2008/0009805 A1 | 1/2008 | Ethelfield | |
| 2008/0015494 A1 | 1/2008 | Santini, Jr. et al. | |
| 2008/0051710 A1 | 2/2008 | Moberg et al. | |
| 2008/0058718 A1 | 3/2008 | Adams et al. | |
| 2008/0157713 A1* | 7/2008 | Chiang et al. | 320/103 |
| 2008/0167620 A1 | 7/2008 | Adams et al. | |
| 2008/0215006 A1 | 9/2008 | Thorkild | |
| 2008/0255516 A1 | 10/2008 | Yodfat et al. | |
| 2008/0257718 A1* | 10/2008 | Chiang et al. | 204/242 |
| 2008/0269687 A1 | 10/2008 | Chong et al. | |
| 2008/0281270 A1 | 11/2008 | Cross et al. | |
| 2008/0317615 A1 | 12/2008 | Banister | |
| 2008/0319414 A1 | 12/2008 | Yodfat et al. | |
| 2009/0014320 A1* | 1/2009 | Chiang et al. | 204/252 |
| 2009/0028824 A1 | 1/2009 | Chiang et al. | |
| 2009/0036867 A1 | 2/2009 | Glejboel et al. | |
| 2009/0054866 A1 | 2/2009 | Teisen-Simony et al. | |
| 2009/0062747 A1 | 3/2009 | Saul | |
| 2009/0088693 A1 | 4/2009 | Carter | |
| 2009/0088694 A1 | 4/2009 | Carter et al. | |
| 2009/0088722 A1 | 4/2009 | Wojcik | |
| 2009/0099521 A1 | 4/2009 | Gravesen et al. | |
| 2009/0099522 A1 | 4/2009 | Kamen et al. | |
| 2009/0124997 A1 | 5/2009 | Pettis et al. | |
| 2009/0163855 A1 | 6/2009 | Shin et al. | |
| 2009/0163874 A1 | 6/2009 | Krag et al. | |
| 2009/0171324 A1 | 7/2009 | Chong et al. | |
| 2009/0182277 A1 | 7/2009 | Carter | |
| 2009/0192471 A1 | 7/2009 | Carter et al. | |
| 2009/0198215 A1 | 8/2009 | Chong et al. | |
| 2009/0326454 A1 | 12/2009 | Cross et al. | |
| 2009/0326455 A1 | 12/2009 | Carter | |
| 2009/0326472 A1 | 12/2009 | Carter et al. | |
| 2010/0007248 A1 | 1/2010 | Chiang et al. | |
| 2010/0022992 A1 | 1/2010 | Genosar et al. | |
| 2010/0063438 A1 | 3/2010 | Bengtsson | |
| 2010/0129699 A1* | 5/2010 | Mikhaylik et al. | 429/50 |
| 2011/0042204 A1 | 2/2011 | Chiang et al. | |

FOREIGN PATENT DOCUMENTS

| | | |
|---|---|---|
| DE | 19809483 | 9/2009 |
| EP | 1621875 | 2/2006 |
| EP | 2015806 B1 | 9/2009 |
| JP | 04127885 | 4/1992 |
| JP | 2001-144342 | 5/2001 |
| WO | WO 95/15589 A1 | 6/1995 |
| WO | WO 96/34417 A | 10/1996 |
| WO | WO 2004/067066 | 8/2004 |
| WO | WO 2005/124918 A2 | 12/2005 |
| WO | WO 2006/123329 | 11/2006 |
| WO | WO 2007/010522 A1 | 1/2007 |
| WO | WO 2007/111880 | 10/2007 |
| WO | WO 2007/129317 | 11/2007 |
| WO | WO 2008/036122 A2 | 3/2008 |
| WO | WO 2008/094196 A2 | 8/2008 |
| WO | WO 2008/129549 | 10/2008 |
| WO | WO 2009/123672 A2 | 10/2009 |

OTHER PUBLICATIONS

Baughman, R. H., "Conducting polymer artificial muscles," *Synthetic Metals*, 1996, 78, 339-353.

Bruesewitz, M., "Elektromische Aktoren," *F&M Feinwerktechnik Mikrotechnik*, Hanser, Munchen, DE, Jul. 1, 1998, 71, 3187-3191.

Che, G., et al., "An Electrochemically Driven Actuator Based on a Nanostructured Carbon Material," *Analytical Chemistry*, 1999, 71, 3187-3191.

Chin, T. E., et al., "Lithium Rechargeable Batteries as Electromechanical Actuators," *Electrochemical and Solid State Letters*, 2006, 9(3), A134-A138.

Gu, G., et al., "$V_2O_5$ Nanofibre Sheet Actuators," *Nature Materials*, 2003, 2, 316-319.

Koyama, Y. et al., "Harnessing the Actuation Potential of Solid-State Intercalation Compounds," *Advanced Functional Materials*, 2006, 16, 492-498.

Lin, K., et al., "Towards Electrochemical Artificial Muscles: A Supramolecular Machine Based on a One-Dimensional Copper-Containing Organophosphonate System," *Angew. Chem. Int. Ed.*, 2004, 43, 4186-4189.

Massey, C. et al., "Graphite intercalation compounds as actuation materials," 2004 Proceedings of IMECE04: 2004 ASME International Mechanical Engineering Congress and Exposition, 117-122.

Massey, C. et al., "Reversible work by electrochemical intercalation of graphitic materials," Smart Structures and Materials 2005: Electroactive Polymer Actuators and Devices (EAPAD), *Proceedings of SPIE*, 5759, 322-330.

Niezrecki, C., et al., "Piezoelectric Actuation: State of the Art," *The Shock and Vibration Digest*, Jul. 2001, 33(4), 269-280.

Paquette, J. W. et al., "Ionomeric Electroactive Polymer Artificial Muscle for Naval Applications," *IEEE Journal of Oceanic Engineering*, Jul. 2004, 29(3), 729-737.

Prechtl, E. F. et al., "Design of a high efficiency, large stroke, electromechanical actuator," *Smart Materials and Structures*, 1999, 8, 13-30.

Shahinpoor, M. et al. "Ionic Polymer-Metal Composites (IPMC) as Biometric Sensors and Actuators," *Proceedings of SPIE's 5th Annual International Symposium on Smart Structures and Materials*, Mar. 1-5, 1998, San Diego, CA, Paper No. 3324-27, 1-17.

Spinks, G.M., et al., "Pneumantic Carbon Nanotube Actuators," *Adv. Mater.*, 2002, 14(23), 1728-1732.

Takada, K., et al., "Electrochemical Actuator with Silver Vanadium Bronzes," *Solid State Ionics*, 1992, vol. 53-56, 339-342.

Thomson, E.A., "Moving Toward Morphing Vehicles," *MIT TechTalk*, Mar. 22, 2006, 50(21), 1-8.

Yamada A., et al., "Optimized $LiFePO_4$ for Lithium Battery Cathodes," *Journal of the Electrochemical Society*, Jan. 1, 2001, 148(3), A224-A229.

International Search Report and Written Opinion from International Patent Application Serial No. PCT/US2005/020554, filed Apr. 26, 2007, mailed Feb. 7, 2008.

International Preliminary Report on Patentability from International Patent Application Serial No. PCT/US2005/020554, filed Apr. 26, 2007, mailed Mar. 4, 2008.

International Search Report and Written Opinion from International Patent Application Serial No. PCT/US2007/016849, filed Jul. 26, 2007, mailed Sep. 24, 2008.

International Preliminary Report on Patentability from International Patent Application Serial No. PCT/US2007/016849, filed Jul. 26, 2007, mailed Jan. 27, 2009.

International Search Report and Written Opinion from International Patent Application Serial No. PCT/US2007/010036, filed Apr. 26, 2007, mailed May 21, 2008.

International Preliminary Report on Patentability from International Patent Application Serial No. PCT/US2007/010036, filed Apr. 26, 2007, mailed Oct. 28, 2008.

European Patent Office Supplemental Search Report from EP 05758772, mailed Mar. 5, 2010.

Biovalue Products, e-Patch, Jun. 26, 2006, http://www.valeritas.com/epatch.shtml.

Codman 3000, Johnson & Johnson Company, 2 pages.

Osborne, R., "Valeritas' Insulin Patch Takes Aim At Type II Drug Resisters," *BioWorld Financial Watch*, 2006, 14(36), 1 page.

International Search Report from International Patent Application Serial No. PCT/US2009/001075, filed Feb. 20, 2009, mailed May 25, 2010.

International Preliminary Report on Patentability for Application Serial No. PCT/US2009/001075, filed Feb. 20, 2009, mailed Sep. 2, 2010.

\* cited by examiner

US 7,994,686 B2

ELECTROCHEMICAL METHODS, DEVICES, AND STRUCTURES

RELATED APPLICATIONS

This application is a continuation-in-part application of U.S. patent application Ser. No. 11/150,477, filed Jun. 13, 2005, which claims priority to U.S. Provisional Application Ser. No. 60/578,855, filed Jun. 14, 2004, and U.S. Provisional Application Ser. No. 60/621,051, filed Oct. 25, 2004, the contents of which are incorporated herein by reference. This application also claims priority under 35 U.S.C. §119(e) to co-pending U.S. Provisional Application Ser. No. 60/795,328, filed Apr. 26, 2006, the content of which is incorporated herein by reference.

STATEMENT REGARDING FEDERALLY SPONSORED RESEARCH OR DEVELOPMENT

This invention was made with the support under the following government contract: W911W6-05-C-0013, awarded by the U.S. Army. The government has certain rights in the invention.

FIELD OF THE INVENTION

The present invention provides devices, and related methods, involving electrochemical actuation.

BACKGROUND OF THE INVENTION

Actuation generally refers to a mechanism by which an object, or portion of an object, can be adjusted or moved by converting energy (e.g., electric energy, chemical energy, etc.) into mechanical energy. Actuators may be categorized by the manner in which energy is converted. For example, electrostatic actuators convert electrostatic forces into mechanical forces.

Piezoelectric actuation provides high bandwidth and actuation authority but low strain (much less than 1% typically), and requires high actuation voltages. Shape memory alloys (SMAs), magnetostrictors, and the newly developed ferromagnetic shape-memory alloys (FSMAs) are capable of larger strain but produce slower responses, limiting their applicability. Actuation mechanisms that are based on field-induced domain motion (piezos, FSMAs) also tend to have low blocked stress. The above actuation methods are based on the use of active materials of high density (lead-based oxides, metal alloys), which negatively impacts weight-based figures of merit. Thus, there is a need for a technology capable of providing high actuation energy density, high actuation authority (stress), large free strain, and useful bandwidth.

Certain methods of actuation using electrochemistry have previously been described, wherein the load-bearing actuation materials are in gaseous or liquid phase and may be expected to have low elastic modulus and consequently low actuation energy density and actuation stress, compared to the approach of the present invention. Despite the observation of displacement, mechanical work has not been demonstrated.

Accordingly, improved methods and devices are needed.

SUMMARY OF THE INVENTION

The present invention relates to articles comprising at least one electrochemical cell comprising an anode, a cathode, and an intercalation species, wherein the electrochemical cell undergoes a volumetric or dimensional change upon the application of a voltage or current; and a structure including at least one portion constructed and arranged to be displaced from a first orientation to a second orientation so as to impart a different fluid dynamic property to the structure by the volumetric or dimensional change of the at least one electrochemical cell.

The present invention also provides methods comprising operating an electrochemical cell comprising a negative electrode, a positive electrode, a nonaqueous electrolyte, and lithium as an intercalation species, wherein the positive electrode has an average equilibrium potential with respect to metallic lithium over the state of charge of its use that is less than about +4V, and the negative electrode has an average equilibrium potential with respect to metallic lithium over the state of charge of its use that is greater than about +0.2V, wherein the electrochemical cell is in operative relationship with a component that can be displaced from a first orientation to a second orientation, and wherein operation of the electrochemical cell causes a volumetric or dimensional change of the electrochemical cell.

The present invention also relates to articles comprising a first and a second electrochemical cell configured in an antagonistic arrangement relative to one another, such that discharge of the first cell results in charging of the second cell, and discharge of the second cell results in charging of the first cell; and a component constructed and arranged to be displaced from a first orientation to a second orientation by charge and/or discharge of at least one of the first and second electrochemical cells.

The present invention also relates to articles comprising an electrochemical cell comprising an anode comprised of a first material and a cathode comprised of a second material, wherein the anode and cathode are constructed and arranged such that during a cycle in which one of the electrodes expands at least 1% by volume, the other electrode does not substantially contract; and a component constructed and arranged to be displaced from a first orientation to a second orientation by charge and/or discharge of the electrochemical cell.

The present invention also relates inorganic structures constructed and arranged to be actuated during use from a first orientation to a second orientation providing different aerodynamic effects in the first and second orientations, wherein the structure is actuated by an electrochemical actuator without movement of immediately adjacent macroscopic components of the structure relative to one another.

Figure 1:
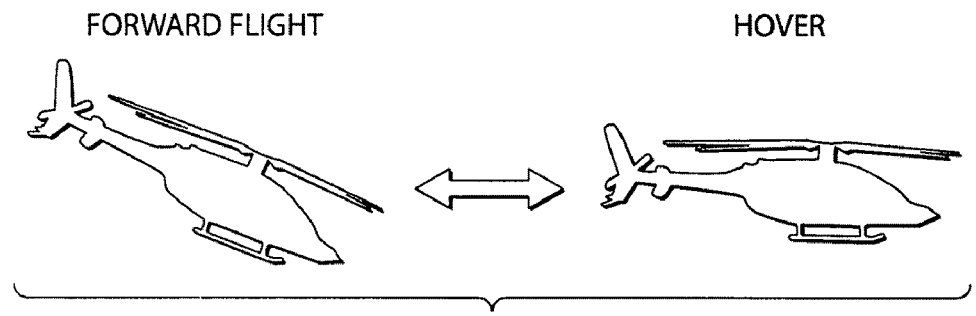
FIG. 1 shows a morphing structure, wherein the structure is a blade of a helicopter, according to one embodiment of the invention.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

The present invention generally provides devices and methods involving electrochemical actuation.

In some cases, the devices (e.g., actuators) may comprise at least one component, wherein application of a voltage or current to the component may generate a volumetric or dimensional change of the component. In some cases, the a volumetric or dimensional change may produce mechanical work. In some embodiments, the device may comprise an intercalation species associated with one or more components (e.g., electrodes) during operation of the device. As used herein, the term "intercalation species" refers to a species, typically an ion, capable of inserting into one or more components of the device. Some embodiments of the invention may involve insertion of an intercalation species in one or more electrodes of the device, generating a volumetric or dimensional change in the electrode. Devices of the invention may exhibit high actuation rates and/or the ability to support high amounts of stress (e.g., in tensile and/or compressive loading).

For example, a device of the invention may comprise an anode, cathode, and lithium ions as the intercalation species. Upon application of an electric field between the anode and the cathode, the device may be reversibly charged and discharged. In some cases, upon charging, the lithium ions may insert into the anode such that the anode undergoes a volumetric or dimensional change relative to the cathode, which remains essentially unchanged in volume or dimension. Upon discharging, the lithium ions may be transported from the anode to the cathode such that the lithium ions are inserted into the cathode. As a result, the anode may return to its volume/shape prior to charging, and the cathode may undergo a volumetric or dimensional change relative to the anode. In some cases, both the anode and cathode, either simultaneously or non-simultaneously, may undergo a volumetric or dimensional change upon charge/discharge cycling. In some cases, only one of the anode and cathode may undergo a volumetric or dimensional change upon charge/discharge cycling.

In some embodiments, the present invention provides an electrochemical actuator comprising at least one electrochemical cell including an anode, a cathode, and an intercalation species (e.g., lithium), wherein the electrochemical cell undergoes a volumetric or dimensional change upon the application of a voltage or current. The electrochemical actuator may comprise, for instance, greater than 2, greater than 4, greater than 10, greater than 20, or greater than 50 such electrochemical cells (which can be operated in series or parallel). The electrochemical actuator also comprises a structure including at least one portion constructed and arranged to be displaced from a first orientation to a second orientation, e.g., by the volumetric or dimensional change of the one, or plurality of electrochemical cells. As the portion of the structure is displaced, mechanical work is produced. In some cases, this mechanical work imparts a different fluid dynamic property to the structure. As used herein, a "fluid dynamic property" refers to a property of a fluid (e.g., liquid, gas) in motion. Fluid dynamic properties may be used to describe, for example, the velocity, pressure, density, temperature, and/or other property of a fluid, or article associated with the fluid, as functions of space and time. Examples of fluid dynamic properties include aerodynamics (e.g., gases in motion) and hydrodynamics (e.g., liquids in motion). Fluid dynamic properties may be useful in describing a characteristic of an article in contact with the fluid, such as the movement and/or displacement of the article within the fluid, or other characteristics of the fluid and/or article associated with the fluid. For example, a fluid dynamic property may be used to describe a property of an aircraft, a wing or propeller of the aircraft, a boat, or a propeller of the boat.

As used herein, a "volumetric or dimensional change" refers to the expansion, contraction, and/or other displacement of a component or portion of a component of the device. The volumetric or dimensional change may comprise one or more amounts of expansion, contraction, elongation, shortening, twisting, bending, shearing, or other displacement in one or more dimensions. In some cases, the volumetric or dimensional change may be isotropic. In some cases, the volumetric or dimensional change may be anisotropic. Such changes may be employed for mechanical work, i.e., actuation. The devices may undergo any range of volumetric or dimensional changes that may be suitable for a particular application.

As discussed in more detail below, a variety of structures can be actuated by the volumetric or dimensional change of an electrochemical cell. For example, devices of the invention may be useful in a morphing structure. As used herein, a "morphing structure" refers to a structure capable of undergoing a change (e.g., a reversible change) in at least one dimension of one or more portions of the structure, for example, upon charge or discharge of an electrochemical cell. In one embodiment, the structure is a blade of a helicopter, e.g., as shown in FIG. 1. In one instance, at least a portion of the blade may be displaced from a first, neutral orientation to a second, low-twisted orientation to change the aerodynamic property of the blade during forward flight of the helicopter. In another instance, the volumetric or dimensional change of the at least one electrochemical cell may cause displacement of the structure from a first, low-twisted orientation to a second, high-twisted orientation, which can cause the helicopter to have a more uniform in-flow. This can be useful for reducing the required power to operate the vehicle, e.g., during hovering.

Figure 3A:
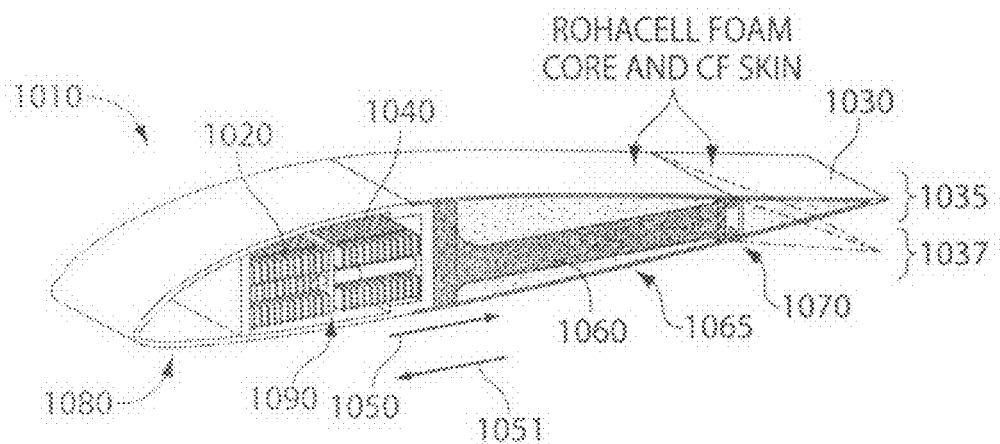
FIG. 3A shows a schematic representation of a morphing blade.

An example of a blade that can be actuated electrochemically is shown in FIG. 3A. As shown in the embodiment illustrated in FIG. 3A, blade 1010 includes a plurality of electrochemical cells 1020 that can undergo a volumetric or dimensional change upon application of a voltage or a current. The electrochemical cells can be connected in series or in parallel, and can be in operative relationship with a different portion of the structure, e.g., trailing edge 1030. The trailing edge can be displaced, for example, from a first orientation 1035 to a second orientation 1037. In one embodiment, the electrochemical cells are in operative relationship with trailing edge 1030 through one or more push rods with steel flextures 1040. Upon expansion and/or a dimensional change of electrochemical cells 1020 in the direction of arrow

1050, the push rods can push reaction ribs 1060 also in the direction of arrow 1050, which can cause the deflection of trailing edge 1030 to a different orientation. Similarly, contraction and/or a dimensional change of the electrochemical cells in the opposite direction can cause the trailing edge to deflect in the opposite direction. The deflection of the trailing edge can occur through a hinged mechanism 1070 in some embodiments. In other embodiments, however, a non-hinged mechanism can cause displacement of the trailing edge. For instance, in one embodiment, instead of using a push rod mechanism, middle portion 1065 of the blade may comprise at least first and second material compositions that respond differently to the expansion or contraction of the electrochemical cells. The first and second material compositions of portion 1065 may be constructed and arranged such that the first material has a higher elastic modulus and/or strain, such that it undergoes a larger degree of displacement relative to the second material during displacement of the electrochemical cell in the direction of arrow 1050. This can result in the bending of the trailing edge from a first to a second orientation. Similarly, contraction of the electrochemical cells in the direction of arrow 1051 can cause a larger degree of displacement of one of the material compositions relative to the other, which can cause bending of the trailing edge, e.g., from the second to the first position. Accordingly, when a force is applied from the electrochemical cell, materials that form middle portion 1065 can undergo a change in shape or orientation in a reproducible and set manner. Those of ordinary skill in the art know which materials that can allow transfer of force when a force is applied to such a material, as well as how such materials are constructed and arranged in a structure to obtain actuation.

Figure 2:
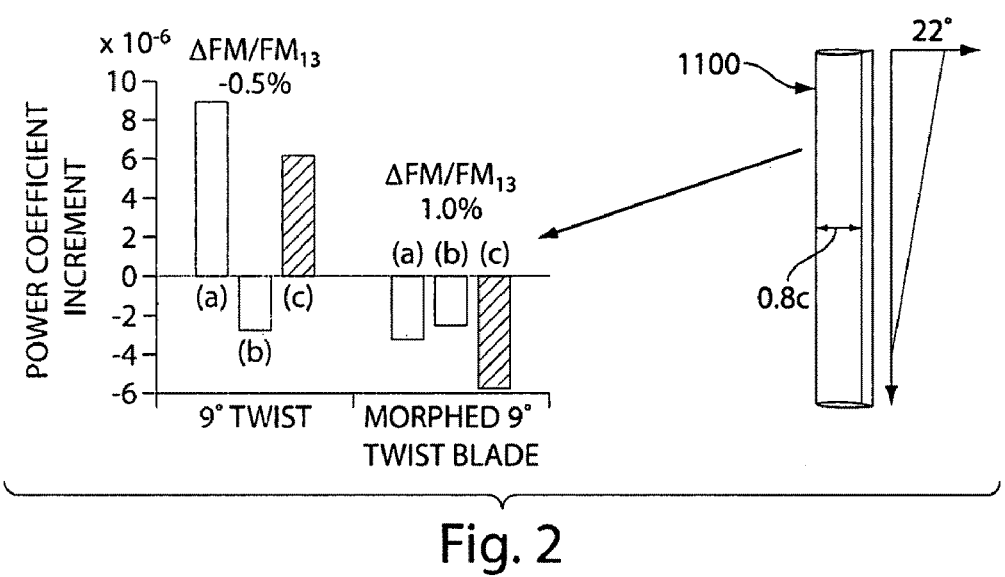
FIG. 2 shows an airfoil having a blade which exhibits a 9 degree linear twist when displaced, and the (a) induced power, (b) profile power and (2) total power for both a blade and a morphed blade.

Accordingly, in some embodiments, at least a portion of a structure can be displaced without movement of immediately adjacent macroscopic portions of the structure relative to one another. For example, in one particular embodiment, an inorganic structure is constructed and arranged to be actuated during use from a first orientation to a second orientation providing different fluid dynamic effects in the first and second orientations, wherein the structure is actuated by an electrochemical actuator without movement of immediately adjacent macroscopic components of the structure relative to one another. Without movement of immediately adjacent macroscopic portions of the structure relative to one another means that with an unaided eye, one cannot discern movement of one macroscopic portion distinctly from another immediately adjacent macroscopic portion of the structure. For example, such structures can include a portion that can be displaced by a continual change in shape of the structure, e.g., through bending, twisting, elongating, or contracting of the structure. In some cases, the ability of a structure to change shape or displace may change as a function of the length of the structure. For instance, as shown in the embodiment illustrated in FIG. 2, airfoil 1100 is a blade with 9 degree linear twist that when morphed (e.g., displaced) has an improved hover figure of merit by 1% with respect to a 13 degree linear twist blade that is not able to morph, while having relatively unchanged forward flight performance compared to the 13 degree linear twist blade. On the other hand, hinged structures are examples of structures that do displace with movement of immediately adjacent macroscopic portions of the structure relative to one another. In other embodiments, displacement is relative to non-immediately adjacent macroscopic portions, e.g., at least a portion of a structure can be displaced without movement of macroscopic portions of the structure relative to one another.

As used herein, a component "constructed and arranged to be displaced" refers to a component that may produce or alter a fluid dynamic property of the component, i.e., through displacement (e.g., actuation) of at least a portion of the component, which affects the performance of the component or structure associated with the component in its intended purpose. Those of ordinary skill in the art would understand the meaning of this term. For example, a structure may comprise a component, wherein the component may be constructed and arranged to propel and/or support the structure in motion. In an illustrative embodiment, a propeller of an aircraft may be constructed and arranged on the aircraft such that motion or other displacement of the propeller affects the performance of the aircraft.

Several different structures can be actuated by an electrochemical cell described herein. For example, in some embodiments, the structure may be a wing, a canard, a fuselage, a tail, an aileron, a fin, a rudder, an elevator, a flap, a pipe, a propeller, a mirror, an optical element, or a combination thereof. Additionally or alternatively, the structure be part of an aircraft, a missile, a spacecraft, a worm, a robot or a satellite. In other embodiments, the structure may be an engine, a motor, a valve, a regulator, a pump, a flow control device, a rotor, or a combination thereof. In embodiments in which the structure is designed to move in water, the structure may be a part of a boat, a hydrofoil, a ship, a submarine or a torpedo. For example, the structure may be a blade, a rudder, a fin, a pipe, a propeller, an optical element, or a combination thereof. In another embodiment, the structure may be an engine, a motor, a valve, a regulator, a pump, a flow control device, a rotor, a switch or a combination thereof.

Advantageously, displacement of a structure, or a portion of a structure, can be achieved through a variety of methods, e.g., bending, twisting, elongating, and contracting, which can be altered by, for example, changing the positioning of the electrochemical cell in relation to the structure to be displaced, the shape of the structure, any materials in operative relationship between the cell and the structure, and/or the material compositions of the components. Additionally, the degree of displacement of a structure, or a portion of a structure, can be tailored towards the particular application. For example, in some embodiments, electrochemical cells of the invention can cause displacement of a structure, or a portion of a structure, of, e.g., greater than 5 degrees, greater than 10 degrees, greater than 20 degrees, greater than 30 degrees, or greater than 40 degrees. Depending on the particular application, in other embodiments, electrochemical cells can cause displacement of, e.g., greater than 1 cm, greater than 10 cm, greater than 20 cm, greater than 50 cm, or greater than 1 m. In an illustrative embodiment, the structure may be a wing of an aircraft, such that a change in the overall shape of a wing (e.g., bending, twisting, etc.) may generate a change in the wing sweep of the aircraft.

The electrochemical cells, and components thereof, may be arranged in various configurations. In some cases, components of the electrochemical cell (e.g., anode, cathode, electrolyte) may be arranged as layers in a stacked configuration. The layers may be thin films, for example. In one embodiment, an electrolyte layer, or other inert or insulating layers, may be positioned between (e.g., may separate) an anode layer and a cathode layer. In some cases, a plurality of discrete electrodes may be arranged in a sequentially stacked configuration, with one or more separator materials positioned to separate each electrode. For example, a separator material may be continuously wound around the electrodes. In some cases, components of the electrochemical cell may be arranged as a stack of layers rolled into a furled configuration, such that, upon application of a voltage to the layers, the components may unwind or wind, producing rotary motion.

The components may also be arranged as fibers to produce a twisting motion. In some cases, components of the electrochemical cell may be arranged as concentric layers of a cylindrical structure (e.g., fiber, tube).

One or more electrochemical cells may be arranged, optionally in combination with one or more components, to achieve displacement of a structure, or a portion of a structure. In some cases, electrochemical cells having different actuation abilities may be arranged on a surface in a pattern, wherein each electrochemical cell is independently controlled. Other configurations of cells, components, and/or devices may be used in the context of the invention, as described in, for example, U.S. Patent Publication No. 2006/0102455, which is based on U.S. patent application Ser. No. 11/150,477, and International Publication No. WO2005/124918, which is based on International Application Serial No. PCT/US/2005/020554, both of which are incorporated herein by reference.

Considerations for the design of low voltage, long-life electrochemical actuators are now described. In some embodiments, the design of a low voltage, long-life electrochemical actuator includes certain operating criteria. In one embodiment, a method of operating an electrochemical cell comprising a negative electrode, a positive electrode, a non-aqueous electrolyte, and lithium as an intercalation species is provided. The electrochemical cell can be operated such that the positive electrode has an average equilibrium potential (or open-circuit voltage (OCV)) with respect to metallic lithium over the state of charge of its use that is less than about +4V. The negative electrode can have an average potential with respect to metallic lithium over the state of charge of its use that is greater than about +0.2V. The electrochemical cell may be in operative relationship with a component that can be displaced from a first orientation to a second orientation. Operation of the electrochemical cell can cause a volumetric or dimensional change of the electrochemical cell. Upon application of a voltage of less than about 10V to the electrochemical cell, the component can be displaced from the first orientation to the second orientation from the volumetric or dimensional change of the electrochemical cell.

As described in more detail below, too high of a potential at the positive electrode can result in electrochemical corrosion of the current collector and/or active materials at the positive electrode. In some cases, the high potential can also cause degradation of nonaqueous electrolytes or salts, which can result in loss of electrolyte conductivity and/or undesirable side effects within the cell. As such, certain electrochemical cells of the invention can be operated to have an average equilibrium potential over the state-of-charge of the cell of less than about +4V, less than about +3.5V, less than about +3.0V or less than about +2.5V.

Also described below, too low of an average equilibrium potential (e.g., with respect to metallic lithium over the state of charge of its use) can cause negative affects such as electrochemical corrosion of the negative electrode current collector or the deposition of lithium metal. Accordingly, electrochemical cells may be operated such that the negative electrode has an average equilibrium potential of greater than about +0.2V, greater than about +0.5V, greater than about +1.0V, or greater than about +1.5V. Depending on the particular electrochemical cell, a maximum and a minimum range of average equilibrium potential of the positive and negative electrodes, respectively, can be chosen. For instance, in one embodiment, the positive electrode has an average equilibrium potential of less than about +3.5V and the negative electrode has an average equilibrium potential of greater than about +0.5V. In another embodiment, the positive electrode has an average equilibrium potential of less than about +3.5V and the negative electrode has an average equilibrium potential of greater than about +1.0V. In yet another embodiment, the positive electrode has an average equilibrium potential of less than about +3.5V and the negative electrode has an average equilibrium potential of greater than about +1.5V. In yet another embodiment, the positive electrode has an average equilibrium potential of less than about +3.0V and the negative electrode has an average equilibrium potential of greater than about +0.5V. Of course, other ranges of average equilibrium potential for the positive and negative electrodes can be chosen.

In certain embodiments, operating an electrochemical cell can involve applying a voltage of less than about 10V to the electrochemical cell and, from the volumetric or dimensional change of the electrochemical cell, displacing the component from a first orientation to a second orientation. As discussed in more detail below, the applied voltage (i.e., the operating voltage) is generally low so as to increase the cycle life of the electrochemical actuator. Accordingly, operating an electrochemical cell may include applying a voltage of less than about 10V, less than about 8V, less than about 7.5V, less than about 6V, less than about 5V, or less than about 4V. It should be understood, however, that for certain periods requiring high power actuation over short time durations, applied voltages may be higher than the steady-state voltage applied. Accordingly, greater than 95% of the operating life of an electrochemical cell may be operated with an applied voltage of less than about 10V, less than about 8V, less than about 7.5V, less than about 6V, less than about 5V, or less than about 4V. In other instances, greater than 90%, greater than 80%, greater than 70%, greater than 60%, or greater than 50% of the operating life of the electrochemical cell may be operated at such voltages.

The following considerations for the design of low voltage, long-life electrochemical actuators are described specifically for the design of nonaqueous electrolyte lithium electrochemical cells. However, is should be understood that the principals can also be applied to any electrochemical cell used as an actuator.

The driving force for transport of ionic species in an electrochemical cell used as an actuator is the overpotential (during charging) or underpotential (during discharging), the overpotential and underpotential being, respectively, the magnitude of the applied voltage over and under the equilibrium or rest or open-circuit voltage (OCV) of the cell at a particular state of charge. The OCV as a function of state of charge can be readily determined by those of ordinary skill in the art if the potential vs. x (concentration) of each compound is known, and if cell parameters such as the ratio of cathode to anode material and the degree of irreversible loss of the ionic species during cycling are known. For example, $LiCoO_2$-graphite cells have an OCV that varies continuously with state of charge between about 3.9V and about 3V, while $LiFePO_4$-graphite cells have a nearly constant voltage of about 3.3V over a wide state of charge.

For high rate of actuation, it is desirable to have a large overpotential during charge and large underpotential during discharge. On the other hand, it is also recognized herein that the range of potentials applied to an electrochemical cell can influence the performance and life of the cell, especially over many charge/discharge cycles, for several reasons. At the high end of the operating voltage range, it is recognized that too high a potential can cause electrochemical corrosion of the current collector (such as aluminum) or active materials at the positive electrode, or degradation of nonaqeuous electrolytes or salts. This can result in loss of electrolyte conductivity or undesirable side effects such as formation of gas within the cell. At the low end of the operating voltage, too low a potential can cause electrochemical corrosion of the negative electrode current collector (such as copper) or the deposition of lithium metal, the latter occurring if the potential at the negative electrode reaches that at which metallic lithium is stable. Thus, for high rate of actuation, as well as for stability and long life in a nonaqueous lithium electrochemical cell used for actuation, it is desirable to have a relatively low OCV such that a high overpotential can be applied during charge without reaching stability limits of the electrolyte system or positive current collector. However, the low OCV should not be too low; otherwise, a high underpotential applied during discharge may reach potentials at which anode current collectors (such as copper) dissolve, or this may cause metallic lithium may be plated. The selection of active materials for the positive and negative electrodes meeting these criteria is important, as it is desirable to provide high actuation energy and power in electrochemical cells of the invention.

In some embodiments, it is desirable to have a positive electrode material with both high rate and high strain, and an OCV measured with respect to metallic lithium that is less than about 4V. In other embodiments, the OCV measured with respect to lithium is less than about 3.5V, less than about 3V, or less than about 2.5V. Non-limiting examples of such positive electrode materials include electrode compounds based on $LiFePO_4$, $TiS_2$, $TaS_2$, and their alloys and compositionally modified forms. In some cases, electrochemical cells include negative electrode materials with high power as well as an OCV over the range of composition used that is at least +0.1V with respect to metallic lithium. In other cases, the OCV is at least +0.5V or more. For example, graphite can be a suitable material when used with a positive electrode material such that the net strain is substantial. Another suitable material includes $Li_xTiO_2$ spinel, e.g., the starting composition $Li_4Ti_5O_{12}$, which upon lithiation has a nearly constant potential of about 1.57V with respect to metallic lithium over a wide range of lithium compositions and nearly zero volume change. Accordingly, this allows the volume change at the positive electrode to be used for actuation. In some embodiments, electrochemical cells based on such combinations of positive and negative electrode materials have cell OCVs typically less than about 3.5V. Of course, it is possible to have a cell voltage that varies between positive and negative values as the cell is charged or discharged, while maintaining throughout the above described conditions of a positive electrode potential that is not too high and a negative electrode potential that is not too low with respect to metallic lithium.

When such a cell is used for electrochemical actuation, the overpotential and underpotential applied can result in a charging voltage that is above, and a discharging voltage that is below, the cell OCV. However, generally, the absolute value of the operating voltage of the cell remains low. For example, the absolute value of the operating voltage may be less than about 10V, less than 7.5V, less than 5V, or less than about 3.5V. It should be noted that for high power actuation over short time duration, the applied voltages can be of a pulsed nature and can safely be significantly higher than the steady-state voltage that would normally result in electrochemical damage to such cells. However, for operation of electrochemical cells under conditions where the cell's voltage is maintained, to obtain long life, the applied voltage may result in a potential at the positive electrode that is less than about 5V, less than about 4.5V, or less than 4V, with respect to metallic lithium. This can be permitted by the use of positive electrode materials based on compounds such as $LiFePO_4$, $LiTiS_2$, and $LiTaS_2$.

Selection criteria for high mechanical energy density, high power electrochemical actuation compounds are now described. The theoretical mechanical energy density of actuation compounds is given by the equation $\frac{1}{2} E\epsilon^2$, where E is the elastic modulus and is the strain that can be induced under particular operating conditions. Thus, materials of high strain and high elastic modulus have the potential for providing higher energy density in electrochemical cells of the invention.

Figure 5:
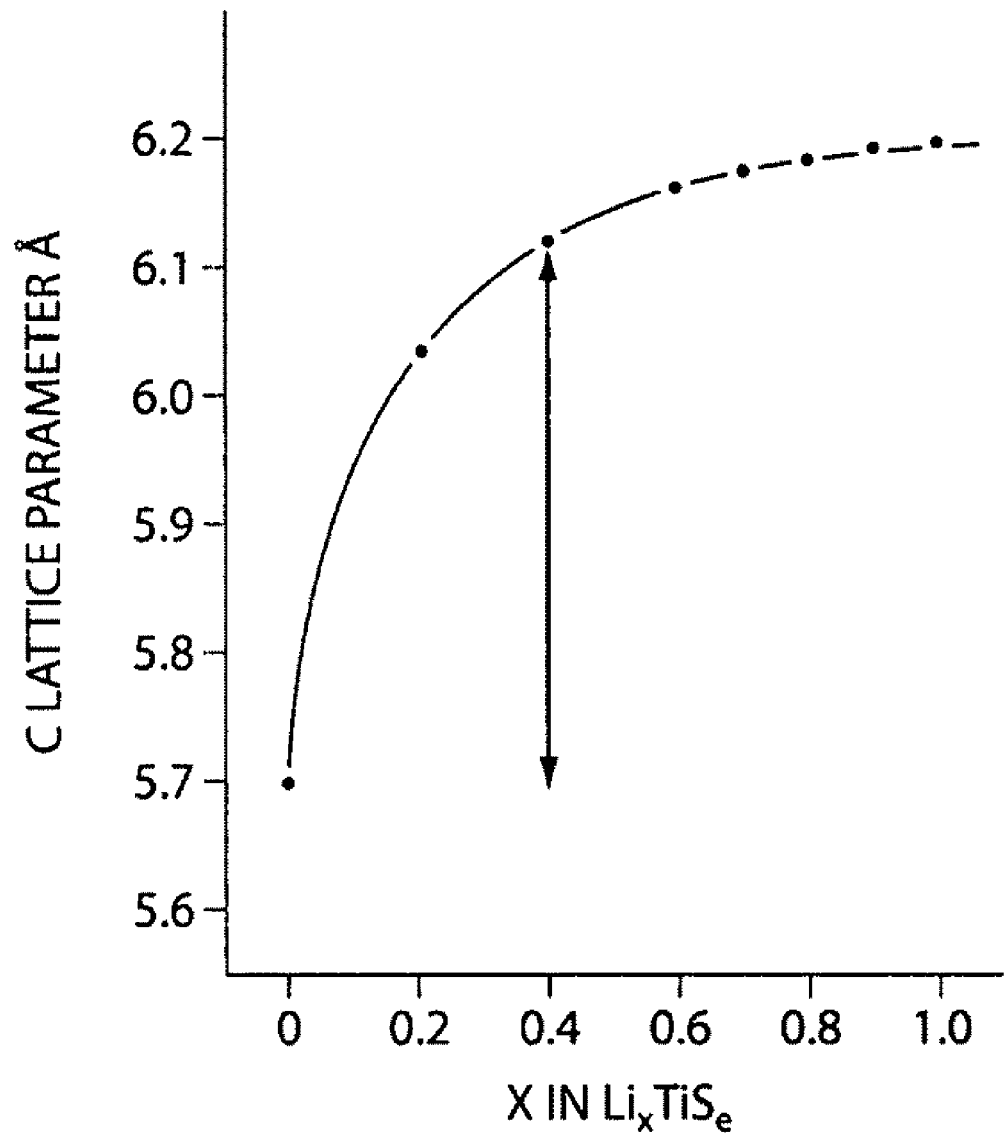
FIG. 5 shows a graph of strain versus Li concentration x of the intercalation compound $Li_xTiS_2$.

With respect to electrochemical actuators, it is recognized herein that the strain obtained is not necessarily linear with the concentration of intercalating or alloying species in the electrochemical cell. For example, FIG. 5 shows the strain vs. Li concentration x of the intercalation compound $Li_xTiS_2$. As shown in the embodiment illustrated in FIG. 5, the slope of this curve is steepest at low Li concentrations. Accordingly, it is desirable when using $Li_xTiS_2$ as an electrochemical actuation compound, to operate over a range of x of about 0 to 0.4 if it is desirable to obtain the most mechanical energy for a given electrical energy used to operate the actuator, and/or to obtain the highest mechanical power from the actuator. The latter follows from the consideration that the amount of intercalated species x is the product of the electrical current and time, so that for a particular operating current, faster actuation is obtained for compounds with a higher strain for a given value of x.

It is also recognized that the mechanical power of electrochemical actuators depends on the rate capability (e.g., rate of charge or discharge) of the electrochemical cell. High rate capability is obtained by selecting electrolytes of high ionic conductivity and/or designing cells so that the ion or electron diffusion lengths are short. For a particle-based electrode, for example, a fine particle size is desirable in order to decrease the diffusion length, and accordingly, the diffusion time.

Figure 4:
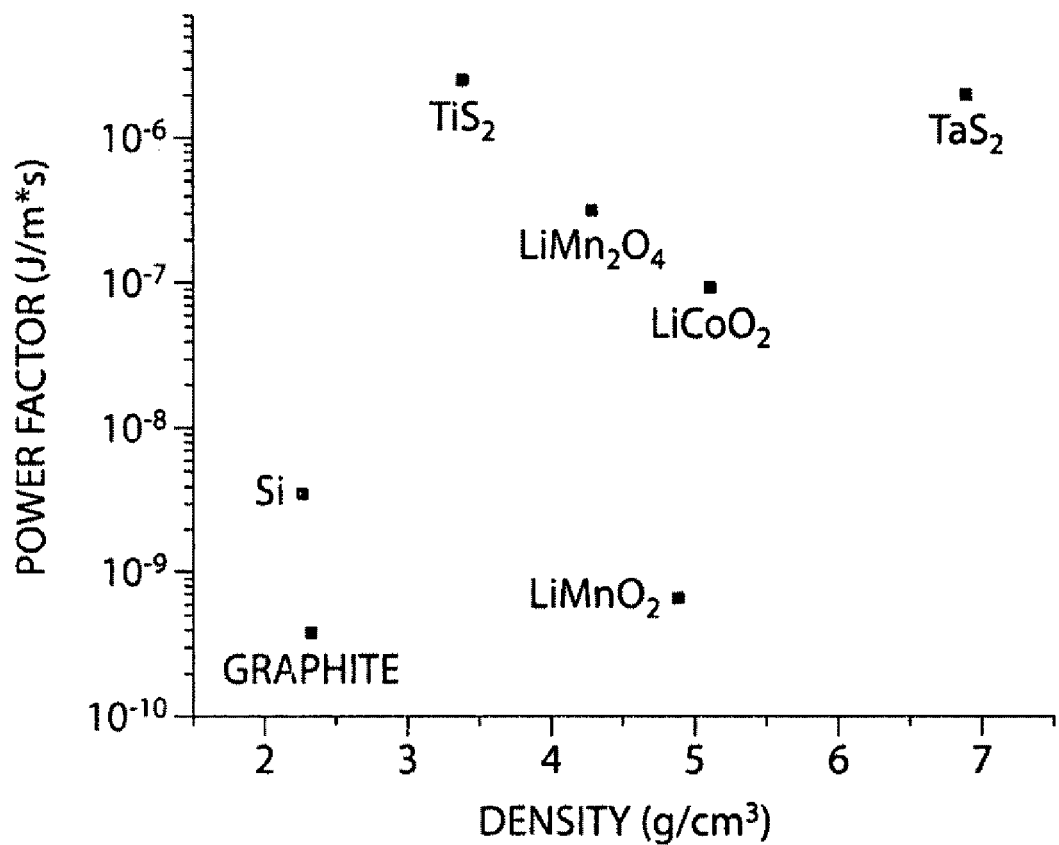
FIG. 4 shows a graph of power factor as a function of density for various materials.

The transport properties of materials is, therefore, also an important selection criterion for designing electrochemical actuators. In particular, the chemical diffusion coefficient of the ionic species responsible for the volume change should be high. One embodiment of the invention identifies a "power factor" that can be used as a figure of merit for comparing different materials, given by the equation $\frac{1}{2} E\epsilon^2 D$, where D is the chemical diffusion coefficient of the ionic species in the material of interest. FIG. 4 compares the power factor of different materials against their specific gravity. It is noted that materials of high power factor and low specific gravity p can, all else being equal, provide higher specific power as an electrochemical actuator. For example, layered dichalcogenides such as $TiS_2$ and $TaS_2$ may be particularly useful electrochemical actuation compounds according to these criteria.

Figure 6:
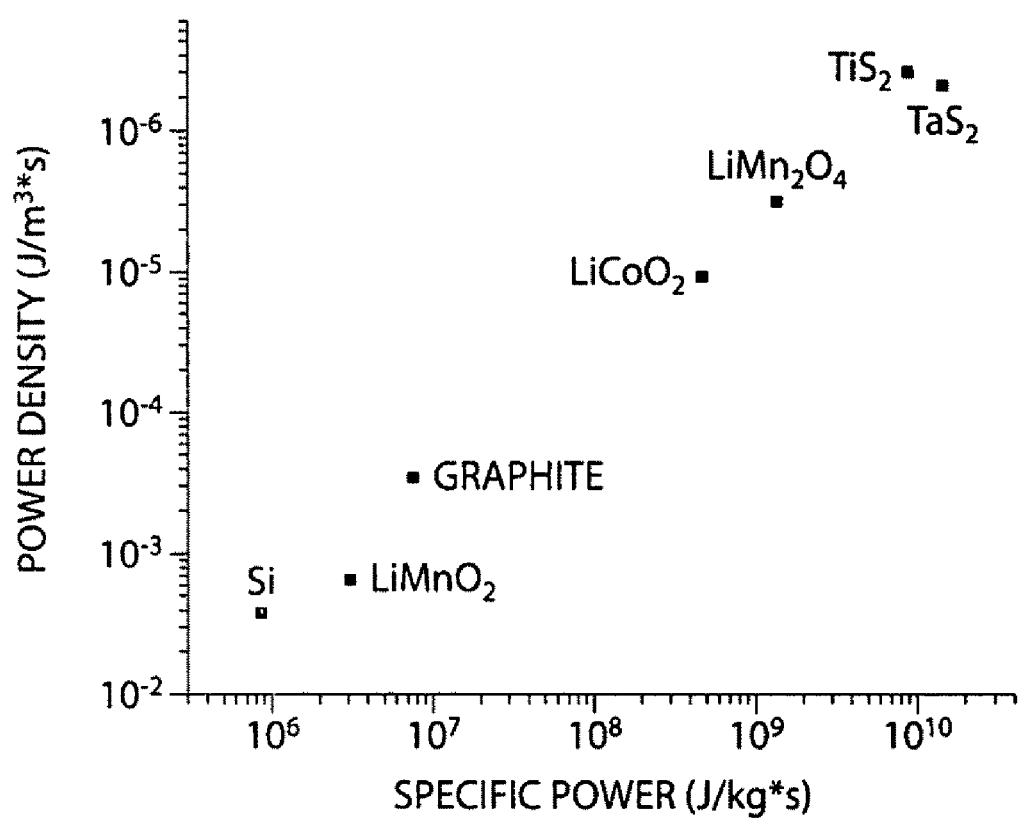
FIG. 6 shows a graph comparing the power density against the specific power of different materials.

The inventors have recognized that figures of merit of interest in the field of actuation also include power density, which is the mechanical power available per unit volume, and specific power, which is the mechanical power available per unit mass. It is desirable to maximize the values of both in most actuation applications. It should be noted that the power density of electrochemical actuators requires consideration of the characteristic diffusion length that the ionic species are transported over during operation of the electrochemical actuator. While the transport length includes the length between electrodes, through the porosity of the electrode, and across the separator, the rate of actuation does not exceed the time necessary for diffusional transport into the material itself. Thus, both the particle size (for a particle-based actuator) and the chemical diffusion coefficient are important factors. To compare materials on a equal basis, assuming that materials can be processed to have similar particle sizes, the power density can be defined as the quantity $\frac{1}{2}(E\epsilon^2 D_{Li}/x^2)$, and the specific power as $\frac{1}{2}(E\epsilon^2 x^2 \rho/D_{Li})$, where x is the particle dimension (e.g., radius or diameter). FIG. 4 compares the power density of different materials against their specific gravity, and FIG. 6 compares the power density against the specific power of different materials. From these selection criterion, suitable materials for electrochemical actuators can be chosen. For example, layered dichalcogenides such as $TiS_2$ and $TaS_2$ can be particularly useful electrochemical actuation compounds.

In one embodiment, electrochemical actuators of the invention utilize at least two (e.g., a first and a second) electrochemical actuators working in concert such that as one is charged (e.g., in order to produce useful mechanical work), the other is discharged, or vice versa. For example, an article may comprise a first and a second electrochemical cell configured in an antagonistic arrangement relative to one another, such that discharge of the first cell results in charging of the second cell, and discharge of the second cell results in charging of the first cell. The article may also include a component constructed and arranged to be displaced from a first orientation to a second orientation by charge and/or discharge of at least one of the first and second electrochemical cells. Of course, a structure including electrochemical cells that are configured in an antagonistic arrangement relative to one another can include a plurality of such sets of electrochemical cells, e.g., greater than 2, greater than 5, greater than 10, greater than 20 or greater than 50 pairs of electrochemical cells that are configured in an antagonistic arrangement. Such cells can be operated in series or in parallel relative to one another.

Although pairs of opposed actuators have been used in active structures previously (for the reason that most actuators work better in tension than in compression or vice versa), there are additional benefits of such designs for use in the electrochemical actuators of the invention. Electrochemical actuators store or release electrical energy at the same time that they are performing mechanical work, and if such electrical energy is dissipated (e.g., in the form of heat by dissipating the electrical energy through a resistor), the energy consumption of the actuator or system of actuators can be high. However, by shuttling electrical energy between actuators so that as one is charged the other is discharged, electrical energy is largely conserved. Another benefit of antagonistic electrochemical actuators, positioned so that each can exert a force on the other, is that the stress placed on the actuators can be controlled by charging or discharging one or both of the opposed actuators. For example, this arrangement can allow the prestress on the actuators to be controlled to optimize actuation force, creep, and/or the compliance of the actuator. Yet another benefit is that the positioning accuracy of the actuator is improved when opposing actuators can be independently charged or discharged.

Typical electrochemical cells include an electrode (e.g., an anode) that expands while the other (e.g., the cathode) contracts during charge, or vice-versa during discharge, in other to reduce the amount of volume change in the cell. This can be advantageous for certain applications since low volume change can, for example, reduce delamination of certain layers within the cell. However, in some embodiments of the invention, it is advantageous for both electrodes to expand during charge or discharge, or for one electrode to not contract while the other expands. Advantageously, such configurations allow maximum energy to be used for actuation, instead of being wasted in counteracting the other electrode.

Accordingly, another embodiment includes an electrochemical cell comprising an anode and a cathode that are constructed and arranged such that during a cycle in which one of the electrodes expands at least 1% by volume, the other electrode does not substantially contract. In other embodiments, one of the electrodes expands at least 0.5% by volume, at least 2% by volume, or at least 4% by volume, while the other electrode does not substantially contract. For instance, as one of the anode or cathode expands, the other can either expand, or may not change in volume. A component can be in operative relationship with such an electrochemical cell, and the component can be displaced from a first orientation to a second orientation by charge and/or discharge of the electrochemical cell. This simultaneous expansion of the anode and cathode, or the expansion of one electrode while the other electrode does not contract, can be performed by using appropriate materials for the anode and cathode.

In some cases, an electrode may spontaneously discharge an intercalation species (e.g., lithium), causing either an expansion or contraction of the electrode and/or movement of one or more components of the device from a first orientation to a second orientation. Electrode materials which exhibit spontaneous discharge are known in the art and may be advantageous in cases where a particular "default" state of the device is desired, for example, in the event of an intentional or accidental short circuit of the electrochemical cell.

Materials suitable for use as electrodes include electroactive materials, such as metals, metal oxides, metal sulfides, metal nitrides, metal alloys, intermetallic compounds, other metal-containing compounds, other inorganic materials (e.g., carbon), and the like. In some cases, the electrodes may advantageously comprise materials having a high elastic modulus. In some cases, the material may be capable of undergoing a change in volume or other dimensions upon interaction with an intercalation species, as described herein. In some embodiments, the electrodes may comprise a material comprising a crystal structure, such as a single crystal or a polycrystal. In some embodiments, the electrodes may comprise an amorphous or disordered material.

In some cases, the material forming the anode comprises one or more of aluminum, silver, gold, boron, bismuth, gallium, germanium, indium, lead, antimony, silicon, tin. In some embodiments, the material forming the anode may comprise Li $Ti_5O_{12}$ or any alloy or doped composition thereof. Examples of materials that can form the cathode include $LiCoO_2$, $LiFePO_4$, $LiNiO_2$, $LiMnO_2$, $LiMn_2O_4$, $Li_4Ti_5O_{12}$, $TiSi_2$, $MoSi_2$, $WSi_2$, $TiS_2$, or $TaS_2$, or any alloy or doped composition thereof. In some cases, the material forming the cathode may comprise $TiS_2$ or $TaS_2$. In others embodiments, the material forming the cathode can comprise $LiMPO_4$, where M is one or more first-row transition metals (e.g., Sc, Ti, V, Cr, Mn, Fe, Co, Ni, Cu, or Zn), or any alloy or doped composition thereof. In some cases, the cathode comprises carbon, wherein the carbon may be in the form of graphite, a carbon fiber structure, a glassy carbon structure, a highly oriented pyrolytic graphite, a disordered carbon structure, or a combination thereof. An electrochemical cell comprising such material compositions may be operated at a cathode potential described above, e.g., less than +4V with respect to the potential of metallic lithium. The anode potential may be selected from the potentials described above, e.g., greater than +0.5V with respect to the potential of metallic lithium.

In some cases, the material forming the electrode may comprise intercalation compounds dispersed within the material. For example, the electrodes may comprise an amount of an intercalation species such that the electrode can serve as a source of the intercalation species within the device. In some embodiments, a substrate or other supporting material may interact with an intercalation species to induce a volumetric or dimensional change. For example, a silicon wafer, or other metal or metal-containing substrate may be lithiated such that a volumetric or dimensional change occurs upon charge/discharge of the electrochemical cell.

The materials for use in electrodes of the invention may be selected to exhibit certain properties upon interaction with an intercalation species (e.g., lithiation and de-lithiation). For example, the materials may be selected to exhibited a certain type or amount of volumetric or dimensional change (e.g., actuation) when used in an electrochemical cell as described herein. Those of those of ordinary skill would be able to select such materials using simple screening tests. In some cases, the properties and/or behavior of a material may be known, and one of ordinary skill in the art would be able to select materials to suit a particular application based on, for example, the amount of volumetric change desired. For example, reversible lithium intercalation with phospho-olivines $Li(Fe,Mn)PO_4$ is known to produce volume changes of 7.4-10%, based on the ratio of Fe/Mn, as described in A. Yamada et al., J. Electrochem. Soc., 148, A224 (2001). In some cases, materials may be screened by incorporating a material as an electrode within an electrochemical cell and observing the behavior of the material upon charge and discharge of the cell.

In some cases, the electrode materials may be selected based on the ability of a material to interact with an intercalation species. For example, where lithium is the intercalation species, a material may be selected based on its ability to rapidly and/or reversibly accept lithium ions (e.g., be lithiated) and/or donate lithium ions (e.g., be de-lithiated) upon charging/discharging. Also, the corresponding strain associated with reversible interaction of the intercalation species with the material may be determined by knowing the rate of ion transport into the material. Such determinations may be tested experimentally or made theoretically using tabulated or estimated values of properties such as ion diffusion coefficients, ionic and electronic conductivities, and surface reaction rate coefficients. Those of ordinary skill in the art would be able to use this information to select appropriate materials for use as electrodes.

Electrodes may be fabricated by methods known in the art. In one embodiment, the electrode materials may be cast from powder-based suspensions containing a polymer binder and/or a conductive additive such as carbon. The suspension may be calendered (e.g., rolled) under high pressure (e.g., several tons per linear inch) to form densely compacted layers having a desired volume percentage of active material.

Materials suitable for use as an electrolyte include materials capable of functioning as a medium for the storage and transport of ions, and in some cases, as a separator between the anode and the cathode. Any liquid, solid, or gel material capable of storing and transporting ions may be used, so long as the material is electrochemically and chemically unreactive with respect to the anode and the cathode, and the material facilitates the transport of ions (e.g., lithium ions) between the anode and the cathode. The electrolyte may be electronically non-conductive to prevent short circuiting between the anode and the cathode.

The electrolyte can comprise one or more ionic electrolyte salts to provide ionic conductivity and one or more liquid electrolyte solvents, gel polymer materials, or polymer materials. In some cases, the electrolyte may be a non-aqueous electrolyte. Suitable non-aqueous electrolytes may include organic electrolytes including liquid electrolytes, gel electrolytes, and solid electrolytes. Examples of non-aqueous electrolytes are described by, for example, Dorniney in Lithium Batteries, New Materials, Developments and Perspectives, Chapter 4, pp. 137-165, Elsevier, Amsterdam (1994), and Alamgir et al. in Lithium Batteries, New Materials, Developments and Perspectives, Chapter 3, pp. 93-136, Elsevier, Amsterdam (1994). Examples of non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted derivatives thereof (e.g., halogenated derivatives thereof), and combinations thereof.

The intercalation species may be any species capable of interaction (e.g., reversible interaction) with one or more electrodes as described herein. In some cases, the intercalation may be inserted into a component upon charge or discharge to produce a volumetric or dimensional change in the component. In some embodiments, the intercalation species may be an ion, such as a proton, an alkali metal, or an alkaline earth metal. For example, the intercalation species may be a lithium, sodium, potassium, rubidium, cesium, francium, beryllium, magnesium, calcium, strontium, barium, or radium ion. In some embodiments, the intercalation species is a lithium ion.

In some embodiments, electrochemical cells may further comprise a separator material (e.g., layer) positioned within the device, for example, between the cathode and anode. The separator may be a material which separates or insulates the anode and the cathode from each other preventing short circuiting, and which permits the transport of ions between the anode and the cathode. Materials suitable for use as separator materials include materials having a high elastic modulus and/or high stiffness (e.g., rigidity), materials which are electronically insulating, and/or materials having sufficient mechanical strength to withstand high pressure, weight, and/or strain (e.g., load) without loss of function. In some cases, the separator layer may be porous. Examples of separator materials include glass, ceramics, a silicate ceramic, cordierite, aluminum oxide, aluminosilicates, or other mixed-metal oxides or nitrides or carbides that are electronically insulating. In some cases, the separator layer may comprise a polymeric material. Separator layers comprising, for example, elastomeric materials, may be useful in allowing shearing motions between one or more components.

In one embodiment, the porous separator material may be cast as a particulate or slurry layer on the surfaces of one or both electrodes prior to assembly of the layers, using methods known to those of ordinary skill in the art of ceramic processing or coating technology, such as spray deposition, doctor blade coating, screen printing, web coating, comma-reverse coating, or slot-die coating.

Devices of the invention may further comprise additional components to suit a particular application. For example, devices of the invention may comprise a power supply, current collector, such as a current collector comprising a conductive material, external packaging layers, separator layers, and the like. The packaging layer may comprise an electrochemically insulating material or other protective material.

The devices may be optionally pretreated or processed prior to use as a morphing structure. Pretreatment of the devices may enhance the mechanical performance, stiffness, actuation energy density, actuation strain, reversibility, and/or lifetime of the devices, and/or may reduce creep deformation and hysteresis of strain. In some cases, the devices, or one or more components thereof, may be subjected to hydrostatic pressure and/or uniaxial stress to consolidate the materials and/or components of the device, and/or reduce the amount of free volume. In some embodiments, the applied pressure may be 10,000 psi, 20,000 psi, 30,000 psi, 45,000 psi, or greater. It should be understood that any amount of applied pressure may be used to pretreat a device, such that internal failure of the device is prevented and/or improvement of device performance may be achieved.

EXAMPLE

The following example describes the use of a morphing structure within a wing, propeller, or blade, for example, for an aircraft (e.g., helicopter).

In aircrafts such as helicopters, a blade or propeller may have an amount of built-in blade twist. Often, highly twisted blades may be efficient in hover mode, but may have poor vibration performance in forward flight mode. (FIG. 1) Without requiring high actuation bandwidths, an electrochemical morphing blade may readily attain a favorable shape for each flight regime. For example, a morphing blade may be actuated between a low-twisted blade to reduce vibration with respect to baseline blade and a high-twisted blade (or other shape) to have more uniform inflow and reduce required power. While inducing twist on a torsional stiff blade typically requires a lot of energy, the use of a morphing blade may involve a slight deflection of a relatively small portion of the blade, such as a trailing edge of the blade, by different amounts along the span of the blade.

Figure 3B:
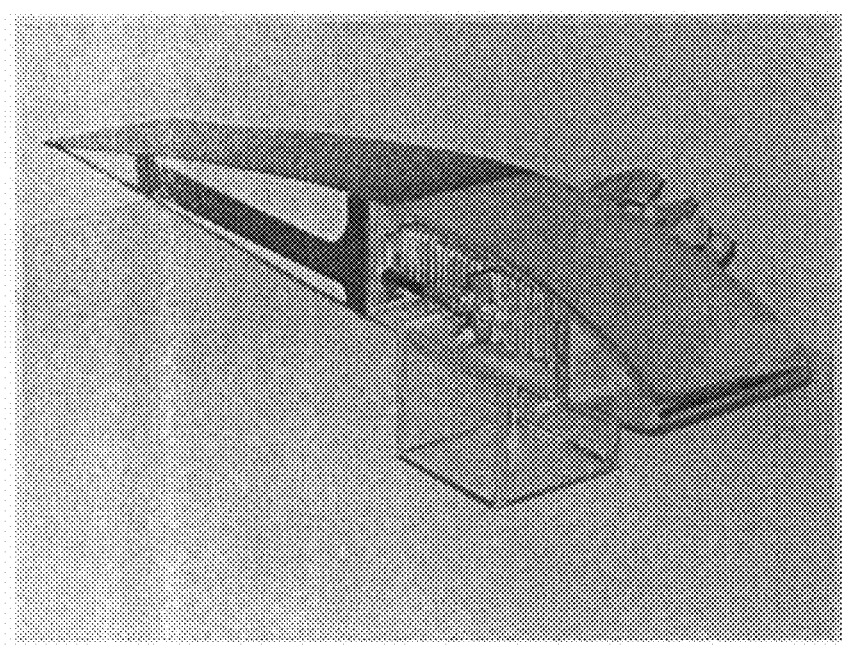
FIG. 3B shows a photograph of the blade prototype.

A prototype blade as shown in FIG. 3A was constructed to have a linear deflection variation using a discrete flap. An aluminum spar 1080 and steel flexures 1040 were machined by EDM, while a fairing was made from Rohacell foam 31IG, covered by carbon fiber veneer. The composite structure was bonded with epoxy using a vacuum bag. The reaction ribs 1060, closing member and flap were then attached. Middle plate 1090 was segmented in three parts to facilitate insertion/removal of the plurality of electrochemical cells 1020. The plurality of electrochemical cells 1020 were compressed between two plates with the help of an Instron machine and were forced into the spar 1080 opening in this condition. The pushrods were then inserted through the sides of spar 1080 and threaded at their ends. The plurality of electrochemical cells 1020 were arranged to be in operative relationship with trailing edge 1030 through the push rods with steel flexures 1040. FIG. 3B shows a photograph of the blade prototype.

Figure 7:
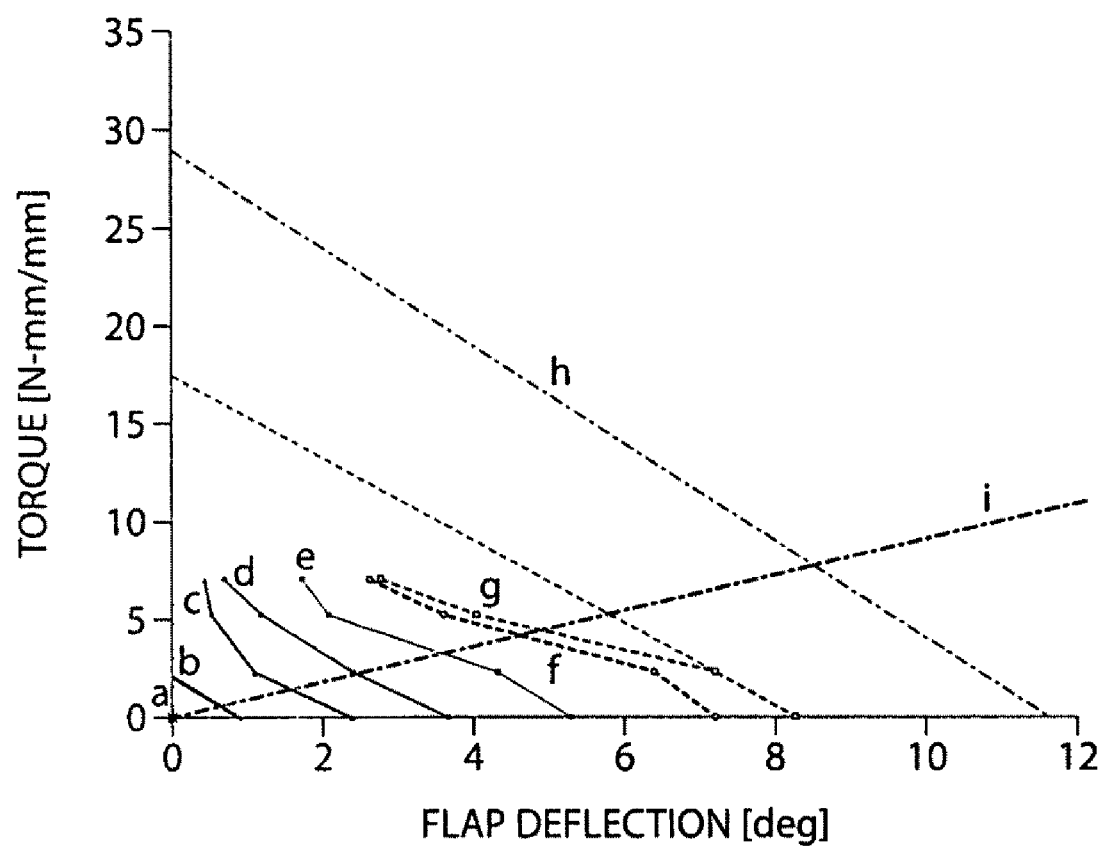
FIG. 7 shows the creep-corrected actuator curves, with torque measured as a function of flap deflection after (a) zero charge, (b) 3 min, (c) 6 min, (d) 9 min, (e) 12 min, (f) 15 min, (g) full charge, with the (h) FE model and (i) aero loads shown as well, for a morphing blade.

The electrochemical cells were reversibly charged and discharged upon application of a voltage, and the reversible movement of trailing edge 1030 from a first orientation to a second orientation was observed. The displacement of trailing edge 1030 (e.g., flap deflection) under different constant loads was measured using a laser, and the middle plate displacement was measured with an LVDT. FIG. 7 shows the creep-corrected actuator curves, with torque measured as a function of flap deflection after (a) zero charge, (b) 3 min, (c) 6 min, (d) 9 min, (e) 12 min, (f) 15 min, (g) full charge, with the (h) FE model and (i) aero loads shown as well, for the blade. While the measured values for energy density and free deflection were less than the values predicted by the model, the blade was shown to successfully actuate. (Table 1) Other factors to consider in the design and manufacture of morphing structures include the elastic properties of the structure, the center of mass location, and the actuator behavior under the centrifugal forces.

TABLE 1

Actuation of a blade structure.

| PROPERTIES | TEST | MODEL |
|---|---|---|
| Free Deflection [deg] | 8.5 | 11.6 |
| Stiffness [Nmm/mm/rad] | 128.6 | 143.1 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:

1. An article, comprising:
   at least one electrochemical cell comprising an anode, a cathode, and an intercalation species, wherein the electrochemical cell undergoes a volumetric or dimensional change upon the application of a voltage or current; and
   a structure including at least one portion constructed and arranged to be displaced from a first orientation to a second orientation so as to impart a different fluid dynamic property to the structure by the volumetric or dimensional change of the at least one electrochemical cell.

2. An article as in claim 1, wherein the structure is an airfoil.

3. An article as in claim 1, wherein the structure is a hull.

4. An article as in claim 1, wherein the structure is a fuselage.

5. An article as in claim 1, wherein the structure is a hydrofoil.

6. An article as in claim 1, wherein the fluid dynamic property is an aerodynamic property.

7. An article as in claim 1, wherein the at least one portion is displaced by a hinge.

8. An article as in claim 1, wherein the at least one portion is not displaced by a hinge.

9. An article as in claim 1, wherein the at least one portion is displaced without movement of immediately adjacent macroscopic portions of the structure relative to one another.

* * * * *